US008953169B2

(12) United States Patent
Lefevre et al.

(10) Patent No.: US 8,953,169 B2
(45) Date of Patent: Feb. 10, 2015

(54) APOLARIZED INTERFEROMETRIC SYSTEM, AND APOLARIZED INTERFEROMETRIC MEASUREMENT METHOD

(75) Inventors: Herve Lefevre, Paris (FR); Cedric Molucon, Paris (FR); Jean-Jacques Bonnefois, Saint-Cloud (FR); Karl Aubry, Maisons Laffitte (FR)

(73) Assignee: Ixblue, Marly le Roi (FR)

( * ) Notice: Subject to any disclaimer, the term of this patent is extended or adjusted under 35 U.S.C. 154(b) by 126 days.

(21) Appl. No.: 13/882,800

(22) PCT Filed: Nov. 2, 2011

(86) PCT No.: PCT/FR2011/052561
§ 371 (c)(1),
(2), (4) Date: May 1, 2013

(87) PCT Pub. No.: WO2012/059690
PCT Pub. Date: May 10, 2012

(65) Prior Publication Data
US 2013/0222810 A1    Aug. 29, 2013

(30) Foreign Application Priority Data
Nov. 3, 2010    (FR) ...................................... 10 59050

(51) Int. Cl.
*G01B 9/02*    (2006.01)
*G01J 9/02*    (2006.01)

(52) U.S. Cl.
CPC ............ *G01B 9/02055* (2013.01); *G01J 9/0246* (2013.01); *G01J 2009/023* (2013.01); *G01J 2009/0261* (2013.01); *G01J 2009/0288* (2013.01)
USPC .......................................... 356/491; 356/483

(58) Field of Classification Search
CPC ............ G01J 2009/0288; G01J 9/0246; G01J 2009/0261; G01J 2009/023; G01B 2290/70; G01B 9/02055
USPC ......... 356/491, 477, 483; 250/227.19, 227.27
See application file for complete search history.

(56) References Cited

U.S. PATENT DOCUMENTS

| 5,426,502 A | 6/1995 | Miyata et al. |
| 5,894,531 A | 4/1999 | Alcoz |

(Continued)

FOREIGN PATENT DOCUMENTS

| EP | 0 393 968 | 10/1990 |
| WO | 00/22383 | 4/2000 |

OTHER PUBLICATIONS

International Search Report dated Jan. 27, 2012, corresponding to PCT/FR2011/052561.

*Primary Examiner* — Kara E Geisel
*Assistant Examiner* — Violeta A Prieto
(74) *Attorney, Agent, or Firm* — Young & Thompson (57) ABSTRACT

An interferometric system includes a polarization separation element (10), a first polarization conversion element (11), a Mach-Zehnder interferometer (2) including a first (4) and second (5) arms connected to one another by a first (6) and second (7) ends in order for a first and second beams (20, 21) having the same polarization to pass through the interferometer in a reciprocal manner in opposite directions of propagation, respectively, so as to form a first and second interferometric beam (22, 23), a second polarization conversion element (11) for obtaining an interferometric beam (24), the polarization of which is converted, a polarization-combining element (10), and a detection element (8) suitable for detecting an output beam (25).

14 Claims, 3 Drawing Sheets

(56) References Cited

U.S. PATENT DOCUMENTS

| | | | |
|---|---|---|---|
| 6,661,361 B1* | 12/2003 | Lewis et al. | 341/137 |
| 7,499,176 B2* | 3/2009 | Adams et al. | 356/483 |
| 7,499,177 B2* | 3/2009 | Katsifolis et al. | 356/483 |
| 7,952,720 B2* | 5/2011 | Katsifolis et al. | 356/483 |
| 8,284,406 B2* | 10/2012 | Nakata et al. | 356/496 |
| 8,395,782 B2* | 3/2013 | Patel et al. | 356/483 |
| 8,629,985 B2* | 1/2014 | Nakata et al. | 356/498 |
| 2005/0180470 A1 | 8/2005 | Sadot et al. | |
| 2006/0163457 A1* | 7/2006 | Katsifolis et al. | 250/227.14 |
| 2008/0191126 A1 | 8/2008 | Adams et al. | |
| 2008/0291462 A1* | 11/2008 | Katsifolis et al. | 356/483 |
| 2009/0185192 A1* | 7/2009 | Katsifolis et al. | 356/483 |
| 2009/0210971 A1* | 8/2009 | Nakata et al. | 850/1 |
| 2010/0014095 A1* | 1/2010 | Patel et al. | 356/483 |
| 2012/0224182 A1* | 9/2012 | Tapanes | 356/477 |
| 2012/0327429 A1* | 12/2012 | Nakata et al. | 356/614 |
| 2013/0208283 A1* | 8/2013 | Tapanes | 356/477 |

* cited by examiner

Prior art

APOLARIZED INTERFEROMETRIC SYSTEM, AND APOLARIZED INTERFEROMETRIC MEASUREMENT METHOD

The present invention relates to interferometric measurement system and method. More precisely, the invention is based on the use of an optical-fiber interferometer of the Mach-Zehnder type. The object of the invention is not to provide an absolute measure of the phase shift between the two arms of the interferometer but rather a measure of the phase-shift variations relatively to a reference value.

The interferometric system of the invention finds applications in the making of very high sensitivity optical sensors. The invention applies in particular to the measurement of the wavelength variations of an optical source located at a great distance from the measurement device. Therefore, in an application relating to the measurement of wavelength of an optical source, the objective is to measure small variations of the source wavelength relative to a reference wavelength. More particularly, the invention relates to an interferometric device for measuring the wavelength variations of a laser emitting in the telecommunication C-band.

Another application is the determination of the frequency noise of optical sources.

The use of an interferometer makes it possible to measure the wavelength variations of an optical source by measuring the variation of the phase shift between the two arms of the interferometer. An interferometer with a very large free spectral range, such as a Michelson interferometer or an asymmetric Mach-Zehnder interferometer, allows reaching a sensitivity typically better than $10^{-4}$ pm in wavelength variation for 10 m of difference between the arms of a Mach-Zehnder interferometer.

To improve the signal-to-noise ratio, the phase shift between the two arms of the interferometer may be modulated in a controlled manner by adding an optical phase modulator on one or two of the interferometer arms. By demodulation of the output power of the interferometer, it is then possible to extract the information about the variation of the phase shift between the arms, which depends directly on the wavelength variation of the source.

In the two-branch interferometers, of the Michelson or Mach-Zehnder type, is posed the problem of polarization-induced attenuation of the signal. First, the source itself may show variations of polarization state and/or degree as a function of time. Then, when the source is connected to the input of the interferometer by a standard optical fiber, the polarization state in the interferometer may vary in a random manner as a function of time due to the torsion of the input fiber, for example. Moreover, when a modulator is used to modulate the signal between the branches of the interferometer, the polarization-sensitivity of the modulator also contributes to the signal attenuation. Therefore, an integrated-optics modulator of the Pockels cell type shows a sensitivity to polarization. Now, the polarization variations induce an attenuation of the signal that reduces the visibility of the interference fringes and increases the measurement noise.

A first known solution consists in using polarization-maintaining components and optical fibers in all the measurement system, from the source to the interferometer output, and in particular on the two arms of the interferometer. In the present document, "standard optical fiber" means a monomode optical fiber that has not the property to preserve the polarization state of a beam. "Polarization-maintaining (PM) fiber" means a monomode optical fiber having the property to preserve the polarization state of a beam propagating over its length. However, if the source is linearly polarized, its alignment with an input PM fiber is often complex. Conversely, if the source is not polarized, the use of an MP fiber at the input reveals useless. Now, the polarization state of the source is not always known in advance. Moreover, the polarization-maintaining fibers have several drawbacks: they are expensive and show an attenuation per unit length far higher than that of standard fibers. It is therefore not conceivable to follow the characteristics of a light source offset by a few hundreds of metres to a few tens of kilometres by means of a polarization-sensitive interferometric system.

Another solution is based on the use of a Michelson interferometer comprising Faraday rotator mirrors at the ends of each arm. The Faraday rotator mirrors allow performing a rotation of the polarization and therefore compensating the effects of birefringence in the fibers on the return path of the interferometer arms. This device allows having between the arms an optical path that is independent of the polarization. Such an interferometer can from then on use standard optical fibers. However, the Faraday mirrors have performances that are very dependent on the wavelength. On the other hand, when it is desired to modulate the interferometric signal, this device requires the use of modulator(s) transmitting the two polarizations. The most standard modulators cannot be used herein because they are made by proton exchange, which causes a very high loss on a polarization axis. Finally, in this configuration, the modulated beam must pass twice through the modulator, thus doubling the fiber/modulator transmission losses, which may reveal very damageable when the energy balance is a significant parameter.

Finally, another solution consists in using two Mach-Zehnder interferometers in parallel and in separating the polarizations to direct one of the polarization states toward a first interferometer and the other polarization state toward a second interferometer after a rotation of 90 degrees of the polarization. However, such a system is very expensive because it requires duplicating the optical components. On the other hand, such a system poses complex problems regarding the balancing of the optical paths between the two interferometers.

One objective of the invention is to propose a polarization-insensitive interferometer, having performances comparable to those of the prior art interferometers used in optimum conditions, while using a reduced number of components and not very expensive optical connections.

The present invention more particularly relates to an apolarized interferometric system comprising:
  polarization separation means operable to separate an incident light beam into a first and a second secondary light beams linearly polarized along polarization directions that are orthogonal to each other,
  first polarization conversion means operable to convert said first secondary beam linearly polarized along one polarization direction into a first converted secondary beam linearly polarized along an orthogonal polarization direction,
  a Mach-Zehnder interferometer comprising a first and a second arms, said arms being of the polarization-maintaining type and being connected to each other by a first and a second ends, the first end being operable to receive said first converted secondary beam, the second end being operable to receive said second secondary beam, said first converted secondary beam and second secondary beam being linearly polarized along a same polarization direction, so that said first converted secondary beam and said second secondary beam pass through the interferometer in a reciprocal manner along respectively opposite directions of propagation, to form a first and a second interferometric beams at the second and the first ends of the interferometer, respectively, said first and second interferometric beams being linearly polarized along a same polarization direction, second polarization conversion means operable to convert said second interferometric beam linearly polarized along one polarization direction into a converted interferometric beam linearly polarized along an orthogonal polarization direction, polarization combination means operable to receive said first interferometric beam and said converted interferometric beam, said interferometric beams being linearly polarized along polarization directions that are orthogonal to each other, to combine them into an output beam, and detection means operable to detect said output beam.

According to an embodiment of the invention:

said interferometer comprises a first two-directional coupler having at least three inputs/outputs and a second two-directional coupler having at least three inputs/outputs, said first and second couplers being located at the first and the second ends of the interferometer, respectively, the polarization separation means and the polarization combination means comprise a two-directional polarization separator, the first polarization conversion means and the second polarization conversion means comprise a two-directional polarization converter, and said interferometric system comprises an optical circulator operable to receive, on the one hand, the incident beam to address it to said polarization separator, and on the other hand, the output beam to address it to the detection means.

According to a preferred aspect of the invention, the system comprises:

polarization-maintaining addressing means connecting said polarization separation means to the first polarization conversion means, polarization-maintaining addressing means connecting said first polarization conversion means to a first end of the interferometer, and polarization-maintaining addressing means connecting said polarization separation means to the second end of the interferometer.

According to another embodiment of the invention:

said interferometer further comprises a first coupler having at least four inputs/outputs and a second coupler having at least four inputs/outputs, said first and second couplers being located at the first and the second ends of the interferometer, respectively, the polarization separation means comprise a polarization separator operable to receive the incident beam and the polarization combination means comprise a polarization combiner operable to address the output beam to the detection means, and the first polarization conversion means comprise a first polarization converter and the second polarization conversion means comprise a second polarization converter.

According to an embodiment of the invention, the system comprises:

polarization-maintaining addressing means connecting said polarization separator to said first polarization converter;

polarization-maintaining addressing means connecting said first polarization converter to said first end of the interferometer;

polarization-maintaining addressing means connecting said polarization separator to said second end of the interferometer;

polarization-maintaining addressing means connecting said second end of the interferometer to said polarization combiner;

polarization-maintaining addressing means connecting said first end of the interferometer to said second polarization converter;

polarization-maintaining addressing means connecting said second polarization converter to said polarization combiner.

According to particular aspects of embodiments of the invention:

the interferometer further comprises modulation means operable to modulate the phase shift between the arms of the interferometer;

the arms of the interferometer comprise polarization-maintaining optical fibers;

the interferometric system comprises addressing means for addressing an incident light beam coming from a source, said addressing means comprising a standard optical fiber.

The invention also relates to an apolarized interferometric measurement method comprising the following steps:

separating an incident light beam into a first and a second secondary light beams linearly polarized along polarization directions that are orthogonal to each other, converting said first secondary beam linearly polarized along one polarization direction into a first converted secondary beam linearly polarized along an orthogonal polarization direction, addressing said first polarization-converted secondary beam at a first end of an interferometer of the Mach-Zehnder type and addressing said second secondary beam to a second end of said interferometer, so that said beams polarized along identical directions of polarization pass through the interferometer in a reciprocal manner along respectively opposite directions of propagation and form a first interferometric beam at the second end of the interferometer and a second interferometric beam at the first end of the interferometer, respectively, converting the polarization of said second interferometric beam so as to obtain a second polarization-converted interferometric beam linearly polarized along a polarization direction orthogonal to that of said first interferometric beam, combining said first interferometric beam and second polarization-converted interferometric beam to form an output beam, detecting said output beam.

According to a preferred embodiment, the method of the invention further comprises a step of modulating the signal between the two branches of the interferometer.

The invention will find a particularly advantageous application in the high-sensitivity optical sensors.

The present invention also relates to the characteristics that will become evident from the following description and that will have to be considered either alone or in any technically possible combination thereof.

This description, which is given by way of non-limitative example, will allow a better understanding of how the invention can be implemented with reference to the appended drawings, in which.

Figure 1:
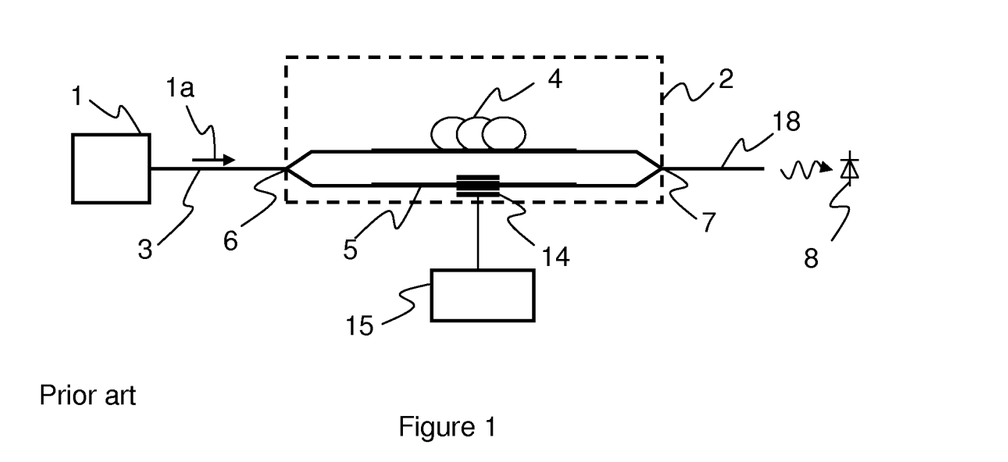
FIG. 1 schematically shows a prior art optical-fiber Mach-Zehnder interferometer.

FIG. 1 shows an interferometric measurement device based on a prior art optical-fiber Mach-Zehnder interferometer. The device of FIG. 1 comprises a laser source 1 that emits an incident beam 1a. Addressing means 3 direct the incident beam 1a toward the input 6 of an interferometer 2 of the Mach-Zehnder type. A splitting coupler at the input of the interferometer splits the incident beam 1a into two beams each directed toward one of the interferometer branches: the branch 4 and the branch 5, respectively. At the other end 7 of the interferometer, the beams interfere with each other, are recombined and transmitted by addressing means 18 toward a detector 8. According to a commonly used configuration, a phase modulator 14, voltage controlled by an electric power supply 15, allows introducing a phase modulation between the branches 4 and 5 of the Mach-Zehnder interferometer. This device allows measuring the wavelength variations of the source 1. However, the phase modulator is generally sensitive to the polarization of the light it transmits. The interferometer of FIG. 1 is thus sensitive to the polarization-state variations of the source and to the polarization-degree variations of the source. Moreover, a standard optical fiber used to couple a source at the input of an interferometer may also be sensitive to polarization variations due to the ambient environment. A possibility according to the prior art is to use polarization-maintaining addressing means 3, such as a polarization-maintaining optical fiber. However, in the case where the source 1 is far away, the wavelength of a polarization-maintaining optical fiber is not always compatible with the characteristics of these fibers. Indeed, on the one hand, the polarization-maintaining optical fibers have a significant attenuation per unit length, and on the other hand, these fibers have a high cost per unit length, the total cost increasing as a function of their total length. The signal-to-noise ratio measured at the output of the interferometer schematically shown in FIG. 1 thus depends generally on the perturbations between the source 1 and the interferometer 2.

Figure 2:
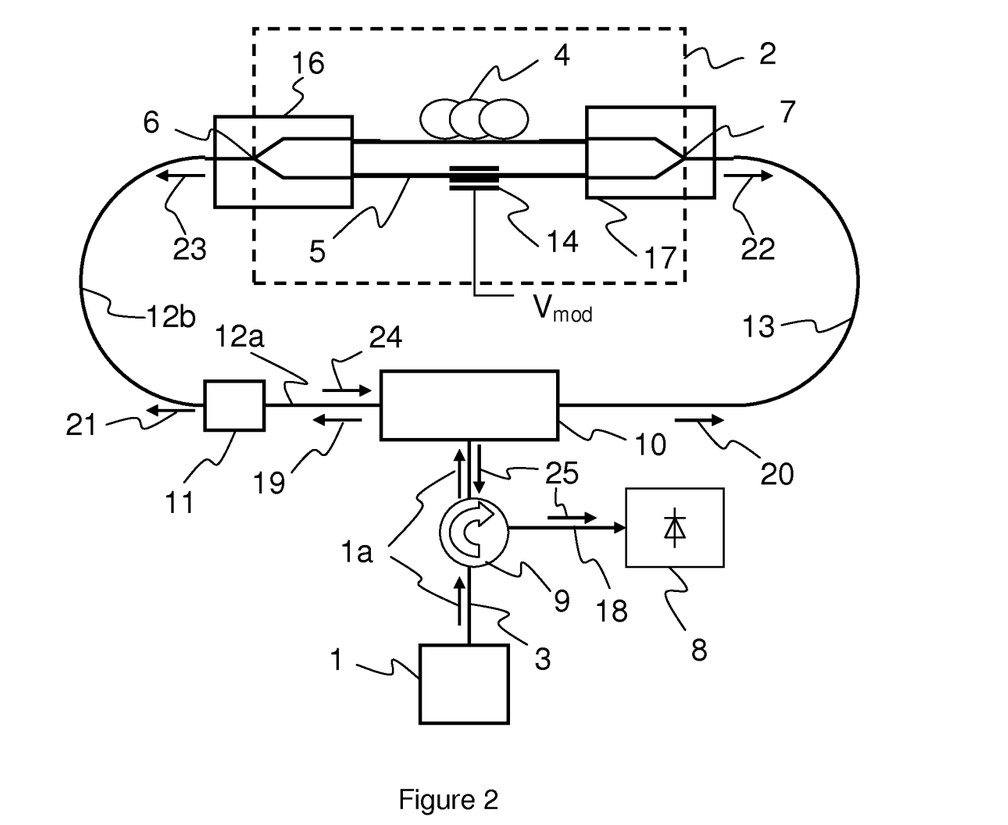
FIG. 2 shows an interferometric measurement device according to a first embodiment of the invention.

FIG. 2 shows an interferometric measurement device according to a preferred embodiment of the invention. The device allows measuring the wavelength variations of a light source 1, which may be far away from the measurement device. The device comprises a circulator 9 that receives the incident beam 1a from the source 1. The circulator 9 transmits the incident beam 1a toward a polarization separator 10. The polarization separator 10 splits the incident beam 1a into a first and a second secondary light beams linearly polarized along respectively perpendicular (beam 19) and parallel (beam 20) polarization directions. The first secondary beam 19 coming from the separator 10 is coupled to a first addressing means 12a, whereas the second secondary beam 20 coming from the separator 10 is coupled to a second addressing means 13. The device also comprises a polarization converter 11 that allows transforming a linearly polarized beam 19 of perpendicular polarization direction into a linearly polarized beam 21 of parallel polarization direction. The polarization converter 11 is interposed between the polarization separator 10 and one of the ends 6 of the Mach-Zehnder interferometer 2. An addressing means 12a connects an output of the polarization separator 10 to an input of the polarization converter 11. An addressing means 12b connects an output of the polarization converter 11 to a first end 6 of the interferometer. An addressing means 13 connects an output of the polarization separator 10 to the second end 7 of the interferometer. The Mach-Zehnder interferometer 2 is a conventional interferometer comprising a first branch 4 and a second branch 5 and two couplers 16 and 17 at each end. A modulator 14 allows modulating the relative phase between the branches 4 and 5 of the interferometer. The beam 19 is polarization-converted by the converter 11 into a linearly polarized beam 21 having the same polarization as the beam 20. The beam 21 is coupled to the input 6 of the interferometer while the beam 20 is coupled to the input 7 of the interferometer. The beams 20 and 21 thus pass through the branches of the interferometer in respectively opposite directions of propagation but with identical directions of polarization. More precisely, the coupler 16 splits the beam 21 at the input of the interferometer and distributes the beam 21 into two secondary beams 21a and 21b propagating on the branches 4 and 5 of the interferometer toward the second end 7 to interfere with each other and to be recombined at the coupler 17 into a beam 22. The interferometric beam 22 is coupled by means of an addressing means 13 toward the polarization separator-combiner 10. Symmetrically, the beam 20 coupled by the coupler 17 at the input 7 is split into two secondary beams 20a and 20b that go through the branches 4 and 5 of the interferometer in a direction opposite to that of the beam 21. The two secondary beams 20a and 20b interfere with each other at the coupler 16 and are recombined at the end 6 of the interferometer to form an interferometric beam 23. The interferometric beam 23 is coupled by means of the addressing means 12b to the polarization converter 11 and undergoes a change of polarization so as to form a beam 24 having a linear polarization orthogonal with respect to that of the interferometric beam 22. The separator 10 receives the interferometric beams 24 and 22 and combines them into a beam 25. The beams 22 and 24 do not interfere with each other because they are of orthogonal polarization with respect to each other. The circulator 9 addresses the beam 25 by means of the addressing means 18 toward the measurement detector 8. The device of FIG. 2 thus allows going through the arms of the interferometer according to a reciprocal configuration with a single state of polarization.

According to various embodiments, the polarization separator 10 may be a calcite crystal or a polarization beam-splitting cube, such as a Glan-Thompson prism.

In free space optics, a polarization converter 11 is conventionally formed by a $\lambda/2$ plate. In guided optics, a polarization converter 11 may be made simply by torsion/orientation of a polarization-maintaining fiber or by welding two sections of polarization-maintaining fiber, whose slow and fast axes are crossed (the slow axis of a first section of PM fiber being aligned with the fast axis of another PM fiber). A particularly advantageous embodiment consists in making by means of a same section of polarization-maintaining optical fiber both the polarization conversion function and the beam addressing function between a first output of the polarization separator 10 and the end 6 of the interferometer. The addressing means 13 between a second output of the separator and the end 7 of the interferometer is also advantageously made by means of a section of polarization-maintaining optical fiber (without polarization conversion). According to a first embodiment, the ends of two sections of polarization-maintaining fibers 12a and 13 are aligned along a same axis on the two outputs of the polarization separator, respectively, and the ends of the fiber sections 12b and 13 are aligned at 90 degrees with respect to each other on the ends 6 and 7 of the interferometer, respectively. According to an alternative embodiment, the ends of the fiber sections 12b and 13 have their axes aligned at the ends 6 and 7 of the interferometer, respectively, while the ends of the two polarization-maintaining fiber sections 12a and 13 are oriented at 90 degrees with respect to each other at the outputs of the separator 10. These two configurations allow making naturally the polarization conversion on a section of polarization-maintaining optical fiber, which thus incorporates the fiber section 12a, the converter 11 and the fiber section 12b. The choice of the configuration is made as a function of the easiness and cost of making of the various components.

According to various embodiments, the modulator 14 may be an integrated electro-optic modulator of the Pockels cell type, made of lithium niobate, or a phase modulator using for example a piezoelectric actuator. Other types of phase modulators are also suitable for the making of a device according to the invention. A phase modulator has generally a privileged polarization direction along which the sensitivity of the modulator is maximal. In the case where the modulator is of the integrated type, it has a maximum sensitivity for a polarization parallel to the surface of the component. In the case where the modulator is made in integrated optics, the privileged polarization state is thus that which is parallel to the surface of the component.

Figure 3:
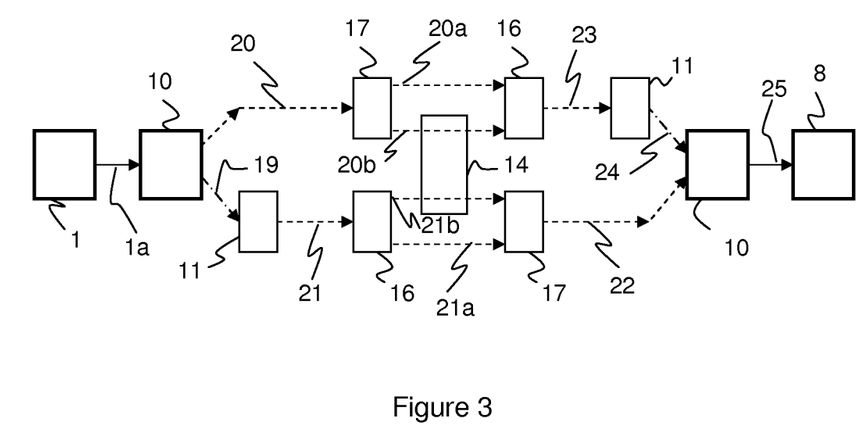
FIG. 3 schematically shows an interferometric measurement method according to a first embodiment of the invention.

FIG. 3 schematically shows the propagation of the various beams, as well as their polarization in a device according to the 1$^{st}$ embodiment of the invention. The incident beam 1a may be either a non-polarized beam or a beam with a polarization varying as a function of time or with a degree of polarization varying as a function of time. The polarization separator 10 separates the incident beam 1a into a polarized beam 19 of perpendicular polarization, schematically shown by a dashed line, and a beam 20 linearly polarized along a parallel polarization direction and schematically shown in dotted line. The beam 19 passes through the polarization converter 11 and is transformed into a beam 21 of parallel polarization identical to that of the beam 20. The beam 20 is coupled to a coupler 17 at an end of the interferometer and split into two secondary beams 20a and 20b each passing through one of the branches, 4 and 5 respectively, of the interferometer. Then, these secondary beams are recombined by the coupler 16 of the interferometer to form an interferential beam 23. The interferential beam 23 passes through the polarization converter 11 and sees its polarization changing into a perpendicular polarization. For its part, the beam 19, after having passed through the polarization converter is converted into a beam 21 and then coupled to the coupler 16 at the end of the interferometer. The coupler 16 separates the beam 21 into two secondary beams 21a and 21b, which propagate along the branches 4 and 5 of the interferometer, respectively, and are recombined at the end 17 into an interferential beam 22 addressed toward the polarization separator-combiner. According to a particular embodiment, a modulator 14 allows modulating the relative phase between the beams 20a and 20b and the beams 21a and 21b, respectively. The separator 10 thus receives a parallel rectilinear polarization beam 22 and a perpendicular polarization beam 24 and combine them into a beam 23 addressed to the detector 8.

By construction, the device of FIG. 2 and the method of FIG. 3 are reciprocal, which makes it possible to ensure that the beams 22 and 24 have passed through the same optical path and correspond to a beam coming from the source at a same instant.

Figure 4:
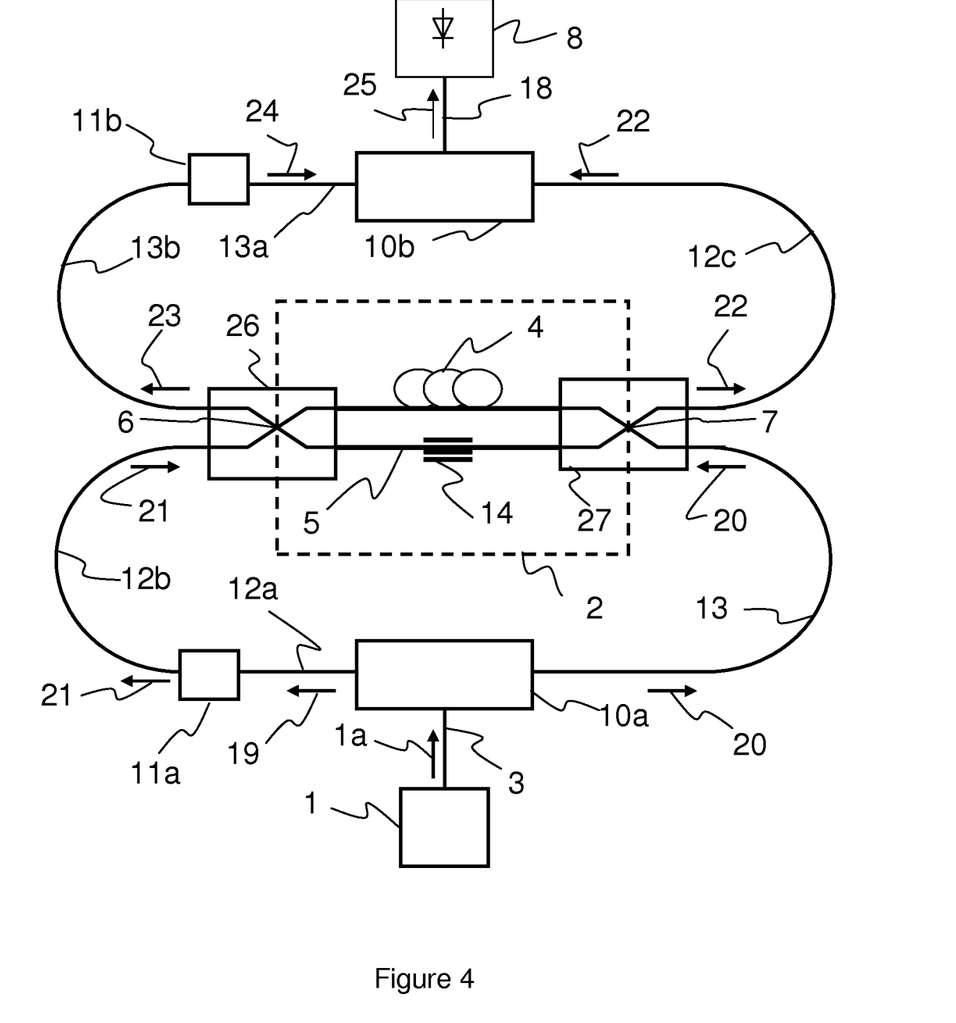
FIG. 4 shows an interferometric measurement device according to a second embodiment of the invention.

FIG. 4 shows an interferometric measurement device according to a second embodiment of the invention. The device does not comprise a circulator but comprises a polarization separator 10a, a polarization combiner 10b, two polarization converters 11a, 11b, and four-way input/output couplers at the ends of the Mach-Zehnder interferometer 2. The device comprises a polarization separator 10a that separates the incident beam 1a into two secondary beams 19 and 20 of perpendicular and parallel polarization, respectively, in the same way as in the device shown in FIG. 2. The beam 19 is polarization-converted after having passed through a first converter 11a into a beam 21 having a polarization identical to that of beam 20. The beam 20 (respectively 21) is addressed to an end 7 (respectively 6) of the interferometer and split into two beams 20a and 20b (respectively 21a and 21b), each directed to a branch 4, 5 of the interferometer. The beams 20a and 21a pass through the same arm 4 of the interferometer along opposite directions of propagation but with identical directions of polarization. Likewise, the beams 20b and 21b pass through the same arm 5 of the interferometer along opposite directions of propagation but with identical directions of polarization. A modulator 14 advantageously allows modulating the relative phase between the branches 4 and 5 of the interferometer. After having passed through the interferometer, the beams 20a and 20b are coupled by the coupler 26 to form a first interferential beam 23, and the beams 21a and 21b are coupled by the coupler 27 to form a first interferential beam 22. The interferential beam 22 is coupled to another addressing beam 12c to be directed toward a polarization combiner 10b. Likewise, at the output of the interferometer, the interferential beam 23 is coupled to addressing means 13b, then to a second polarization converter 11b to form an interferential beam 24 having a polarization that is orthogonal with respect to the interferential beam 22. The beam 24 is coupled via addressing means 13a toward the polarization combiner 10b, which superimposes the beams 22 and 24 to form an interferometric beam 25 directed toward the detector 8.

According to a preferred embodiment of the device shown in FIG. 4, the polarization separator 10a and the polarization combiner 10b are two polarization splitting cubes. The couplers 16, 17, 26, 27 may be of two types: fiber couplers or integrated-optics couplers. It is also possible to use in a same device a fiber coupler at one end of the interferometer and an integrated coupler at the other end. An integrated-optics component for example may allow integrating a coupler and a modulator on a same support. Nevertheless, it is to be noted that the symmetrical configuration, according to which the modulator is arranged at the center of the device (as shown in FIGS. 2 and 4, for example), is the best configuration, in particular for the measurement of rapid variations.

Figure 5:
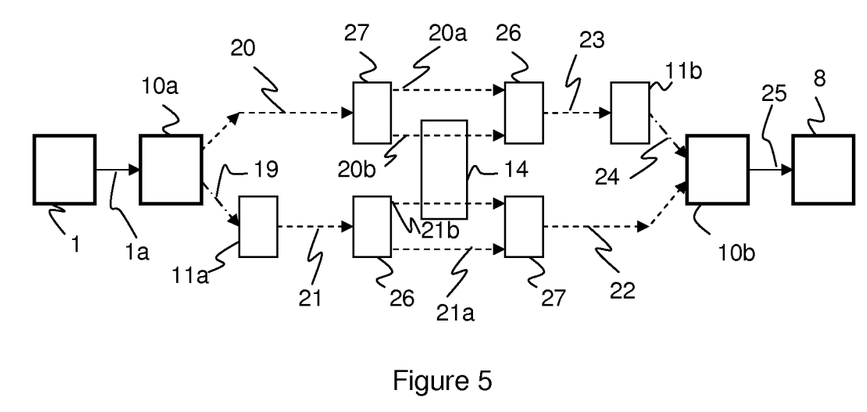
FIG. 5 schematically shows an interferometric measurement method according to a second embodiment of the invention.

FIG. 5 schematically shows the propagation of the beams in the device of FIG. 4, and in particular the polarization of the various beams according to their propagation in a device according to the second embodiment of the invention. Here are also the source 1, the input polarization separator 10a, and the input polarization converter 11a. The interferometer comprises two couplers 26, 27 with four inputs/outputs. The device further comprises a second polarization converter 11b and a polarization combiner 10b. The incident beam 1a coming from the source 1 is separated by the polarization separator 10a into two beams 19, 20 of perpendicular and parallel polarization, respectively. The polarization converter 11a transforms the polarization of the beam 19 so that it is identical to that of the beam 20, then each beam 20, 21 is coupled to an end 6, 7 by means of a coupler 26, 27, respectively. The coupler 26 separates the converted secondary beam 21 into two beams 21a, 21b, which propagate along the branches 4, 5 of the interferometer, respectively, and are then recombined by the coupler 27 and interfere with each other to form the first interferential beam 22. Likewise, the coupler 27 separates the secondary beam 20 into two beams 20a, 20b, which propagate along the branches 4, 5 of the interferometer, respectively, and which are then recombined by the coupler 26 and interfere to form the second interferential beam 23, of same polarization as that the first interferential beam 22. According to a particular embodiment, a modulator 14 allows modulating the relative phase between the beams 20a and 20b and between the beams 21a and 21b, respectively. At the two ends of the interferometer 2, the interferential beams 22, 23 are of identical polarization. A second polarization converter 11b transforms the polarization of the beam 23 so as to form a beam 24 having a polarization orthogonal with respect to the polarization of the beam 22. The polarization combiner 10b allows superimposing the interferential beams 22 and 24 to form an interferential beam 25 directed toward the detector 8. The beams 22 and 24 do not interfere with each other because they are of orthogonal polarization with respect to each other.

The device of FIG. 4 and the method of FIG. 5 allow making sure that each of the output interferential beams 22, 24 has passed once through one of the two polarization converters 11a or 11b.

The device of FIG. 4 allows avoiding the use of a circulator to separate the input beam 1a and the output beam 25.

Other variants of the device of FIG. 4 are possible. In particular, according to another embodiment not shown, it is possible to place the second converter 11b on the branch 12c of the addressing means, on the path of the beam 22. In this case, one of the interferential secondary beams passes through the two polarization converters 11a and 11b, whereas the other interferential beam undergoes no polarization conversion. This embodiment thus goes off a perfectly reciprocal device. However, is also allows obtaining a polarization-insensitive interferometric system.

In all the embodiments, the device of the invention allows measuring the totality of the interferometric signal intensity, because it adds two interferential signals and does not eliminate any contribution. This device offers the advantage to be insensitive to the polarization variations of the source.

The addressing means 12a, 12b, 12c and 13, 13a, 13b, as well as the branches 4 and 5 of the Mach-Zehnder interferometer are polarization-maintaining means. According to a preferred embodiment of the invention, the addressing means 12a, 12b and 13 are polarization-maintaining optical fibers and the branches 4 and 5 of the Mach-Zehnder interferometer are also consisted of polarization-maintaining optical fibers. Likewise, the addressing means 12c, 13a and 13b of the device shown in FIG. 4 are also polarization-maintaining addressing means, and preferably polarization-maintaining optical fibers. On the other hand, the addressing means 3 comprised between the laser source to be measured and the input point of the device (the input polarization separator 10, 10a) may be consisted by a standard optical fiber. It is not necessary to use a polarization-maintaining optical fiber between the source 1 and the input of the measurement device, which allows measuring the wavelength variations of a source that may be very far away from the measurement device.

The device of the invention provides apolarized measurements, i.e. independent of the polarization state and degree of the source. The device and the method of the invention offer the advantage to allow the use of a low-loss standard optical fiber between the light source and the input of the interferometric device.

The device of the invention allows measuring the wavelength variations of a laser sensitive, for example, to the variations of its environment (pressure, temperature . . . ). The variation of the phase shift $\Delta\phi$ between two arms of a Mach-Zehnder interferometer is measured:

$$\Delta\phi = 2\pi \cdot \Delta L / \lambda$$

where $\Delta L$ represents the difference of optical length between the two arms.

When the length of the interferometer arms is fixed, the measurement of the phase shift $\Delta\phi$ thus allows measuring the variations $\Delta\lambda$ of the wavelength $\lambda$ of the source 1.

The device of the invention is, by construction, a device that is perfectly reciprocal at the level of the Mach-Zehnder interferometer. The beam coming from the source is separated into two waves (ascending and descending) that pass through the same optical paths. The reciprocity between the optical paths allows obtaining a phase shift between the strictly identical arms in the two directions of propagation. The device of the invention thus allows obtaining the same performances as those of a Mach-Zehnder interferometer, in which all the components would be perfectly aligned from the source. The device of the invention offers the advantage that it can be coupled to a source without a procedure of alignment of the source relative to a polarization axis. The device of the invention does not require the polarization of the source to be known a priori.

The device and the method of the invention have the advantage to use the totality of the signal of the source, whatever the polarization degree and state of the source beam and whatever the polarization variations of the source beam as a function of time.

The invention claimed is:

1. An apolarized interferometric system comprising:
polarization separation means (10, 10a) operable to separate an incident light beam (1a) into a first (19) and a second (20) secondary light beams linearly polarized along polarization directions that are orthogonal to each other, first polarization conversion means (11, 11a) operable to convert said first secondary beam (19) linearly polarized along one polarization direction into a first converted secondary beam (21) linearly polarized along an orthogonal polarization direction, a Mach-Zehnder interferometer (2) comprising a first (4) and a second (5) arms, said arms (4, 5) being of the polarization-maintaining type and being connected to each other by a first (6) and a second (7) ends, the first end (6) being operable to receive said first converted secondary beam (21), the second end (7) being operable to receive said second secondary beam (20), said first converted secondary beam (21) and second secondary beam (20) being linearly polarized along a same polarization direction, so that said first converted secondary beam (21) and said second secondary beam (20) pass through the interferometer in a reciprocal manner along respectively opposite directions of propagation, to form a first and a second interferometric beams (22, 23), at the second (7) and the first (6) ends of the interferometer (2), respectively, said first and second interferometric beams (22, 23) being linearly polarized along a same polarization direction, second polarization conversion means (11, 11b) operable to convert said second interferometric beam (23) linearly polarized along one polarization direction into a converted interferometric beam (24) linearly polarized along an orthogonal polarization direction, polarization combination means (10, 10b) operable to receive said first interferometric beam (22) and said converted interferometric beam (24), said interferometric beams (22, 24) being linearly polarized along polarization directions that are orthogonal to each other, to combine them into an output beam (25), and detection means (8) operable to detect said output beam (25).

2. The interferometric system according to claim 1, characterized in that:

said interferometer (2) further comprises a first two-directional coupler (16) having at least three inputs / outputs and a second two-directional coupler (17) having at least three inputs / outputs, said first and second couplers (16, 17) being located at the first and the second ends (6, 7) of the interferometer, respectively, the polarization separation means (10, 10a) and the polarization combination means (10, 10b) comprise a two-directional polarization separator (10), the first polarization conversion means (11, 11a) and the second polarization conversion means (11, 11b) comprise a two-directional polarization converter (11), and in that said interferometric system further comprises an optical circulator (9) operable to receive, on the one hand, the incident beam (1a) to address it to said polarization separator (10), and on the other hand, the output beam (25) to address it to the detection means (8).

3. The interferometric system according to claim 1, characterized in that it further comprises:

polarization-maintaining addressing means (12a) connecting said polarization separation means (10, 10a) to the first polarization conversion means (11, 11a), polarization-maintaining addressing means (12b) connecting said first polarization conversion means (11, 11a) to a first end (6) of the interferometer (2), and polarization-maintaining addressing means (13) connecting said polarization separation means (10, 10a) to the second end (7) of the interferometer (2).

4. The interferometric system according to claim 1, characterized in that:

said interferometer (2) further comprises a first coupler (26) having at least four inputs / outputs and a second coupler (27) having at least four inputs / outputs, said first and second couplers (26, 27) being located at the first and the second ends (6, 7) of the interferometer, respectively, the polarization separation means (10, 10a) comprise a polarization separator (10a) operable to receive the incident beam (1a) and the polarization combination means (10, 10b) comprise a polarization combiner (10b) operable to address the output beam (25) to the detection means (8), and the first polarization conversion means (11, 11a) comprise a first polarization converter (11a) and the second polarization conversion means (11, 11b) comprise a second polarization converter (11b).

5. The interferometric system according to claim 4, characterized in that it comprises:

polarization-maintaining addressing means (12a) connecting said polarization separator (10a) to said first polarization converter (11a);

polarization-maintaining addressing means (12b) connecting said first polarization converter (11a) to said first end (6) of the interferometer (2);

polarization-maintaining addressing means (13) connecting said polarization separator (10a) to said second end (7) of the interferometer (2);

polarization-maintaining addressing means (12c) connecting said second end (7) of the interferometer (2) to said polarization combiner (10b);

polarization-maintaining addressing means (13b) connecting said first end (6) of the interferometer (2) to said second polarization converter (11b);

polarization-maintaining addressing means (13a) connecting said second polarization converter (11b) to said polarization combiner (10b).

6. The interferometric system according to claim 1, characterized in that the interferometer (2) further comprises modulation means (14) operable to modulate the phase shift between the arms (4, 5) of the interferometer.

7. The interferometric system according to claim 1, characterized in that the arms (4, 5) of the interferometer (2) comprise polarization-maintaining optical fibers.

8. The interferometric system according to claim 1, characterized in that it comprises addressing means (3) for addressing an incident light beam (1a) coming from a source (1), said addressing means comprising a standard optical fiber.

9. An apolarized interferometric measurement method comprising the following steps:

separating an incident light beam (1a) into a first (19) and a second (20) secondary light beams linearly polarized along polarization directions that are orthogonal to each other, converting said first secondary beam (19) linearly polarized along one polarization direction into a first converted secondary beam (21) linearly polarized along an orthogonal polarization direction, addressing said first polarization-converted secondary beam (21) at a first end (6) of an interferometer (2) of the Mach-Zehnder type and addressing said second secondary beam (20) to a second end (7) of said interferometer (2), so that said beams (20, 21) polarized along identical directions of polarization pass through the interferometer (2) in a reciprocal manner along respectively opposite directions of propagation and form a first interferometric beam (22) at the second end (7) of the interferometer (2) and a second interferometric beam (23) at the first end (6) of the interferometer (2), respectively, converting the polarization of said second interferometric beam (23) so as to obtain a second polarized-converted interferometric beam (24) linearly polarized along a polarization direction orthogonal to that of said first interferometric beam (22), combining said first interferometric beam (22) and second polarization-converted interferometric beam (24) to form an output beam (25), detecting said output beam (25).

10. The method according to claim 9, characterized in that it further comprises a step of modulating the signal between the two branches (4, 5) of the interferometer (2).

11. The interferometric system according to claim 2, characterized in that it further comprises:

polarization-maintaining addressing means (12a) connecting said polarization separation means (10, 10a) to the first polarization conversion means (11, 11a), polarization-maintaining addressing means (12b) connecting said first polarization conversion means (11, 11a) to a first end (6) of the interferometer (2), and polarization-maintaining addressing means (13) connecting said polarization separation means (10, 10a) to the second end (7) of the interferometer (2).

12. The interferometric system according to claim 2, characterized in that the interferometer (2) further comprises modulation means (14) operable to modulate the phase shift between the arms (4, 5) of the interferometer.

13. The interferometric system according to claim 2, characterized in that the arms (4, 5) of the interferometer (2) comprise polarization-maintaining optical fibers.

14. The interferometric system according to claim 2, characterized in that it comprises addressing means (3) for addressing an incident light beam (1a) coming from a source (1), said addressing means comprising a standard optical fiber.

* * * * *